Feb. 16, 1926.

V. H. TODD 1,572,908

GRAPHIC METER

Filed Oct. 28, 1922

WITNESSES:
R.J. Butler
F.H. Miller

INVENTOR
Victor H. Todd.
BY
Eberley G. Carr
ATTORNEY

Patented Feb. 16, 1926.

1,572,908

UNITED STATES PATENT OFFICE.

VICTOR H. TODD, OF SUMMIT, NEW JERSEY, ASSIGNOR TO WESTINGHOUSE ELECTRIC & MANUFACTURING COMPANY, A CORPORATION OF PENNSYLVANIA.

GRAPHIC METER.

Application filed October 28, 1922. Serial No. 597,542.

*To all whom it may concern:*

Be it known that I, VICTOR H. TODD, a citizen of the United States, and a resident of Summit, in the county of Union and State of New Jersey, have invented a new and useful Improvement in Graphic Meters, of which the following is a specification.

My invention relates to graphic meters and particularly to controlling mechanisms therefor.

One object of my invention is to provide a device of the above-indicated character in which a movable indicating or recording member, which opposes movement of a controlling quantity-responsive element therefor, shall be adjustable to vary the degree of opposition to the quantity-responsive element without disturbing the initial or zero setting of the instrument.

Another object of my invention is to provide a graphic meter that shall be simple and durable in construction and effective in its operation.

Heretofore, it has been usual, in a graphic meter of a certain type, to employ an angularly movable quantity-responsive element, such as the movable element of a Kelvin balance, and a rectilinearly-movable member, such as a traveling nut or a pen carriage, that is controlled by the balance to move in accordance with a quantity to be measured. In such instrument, as shown in Patent No. 1,289,503, Electrical Measuring Instrument, issued Dec. 31, 1918, it has been usual to employ a pivoted arm having its pivot coaxial with, and relatively movable with respect to, the balance, and its free end having a lost-motion connection to the pen carriage. A spring, connected between the pivoted arm and the movable member of the balance, was adapted to transmit an opposing force to movement of the balance, in accordance with the position of the pen carriage.

While the above construction permitted a certain amount of adjustment by a direct manipulation of the spring, such adjustment was a tedious and painstaking operation.

In practicing my invention, I provide a mechanism of the above-indicated character in which an additional adjustment independent of the spring is provided whereby, after the spring has been permanently mounted in adjusted position, the amount of tension therein which is transmitted to the balance may be varied to oppose the balance by different degrees throughout the scale of the instrument without disturbing the zero-setting adjustment.

Figure 1:
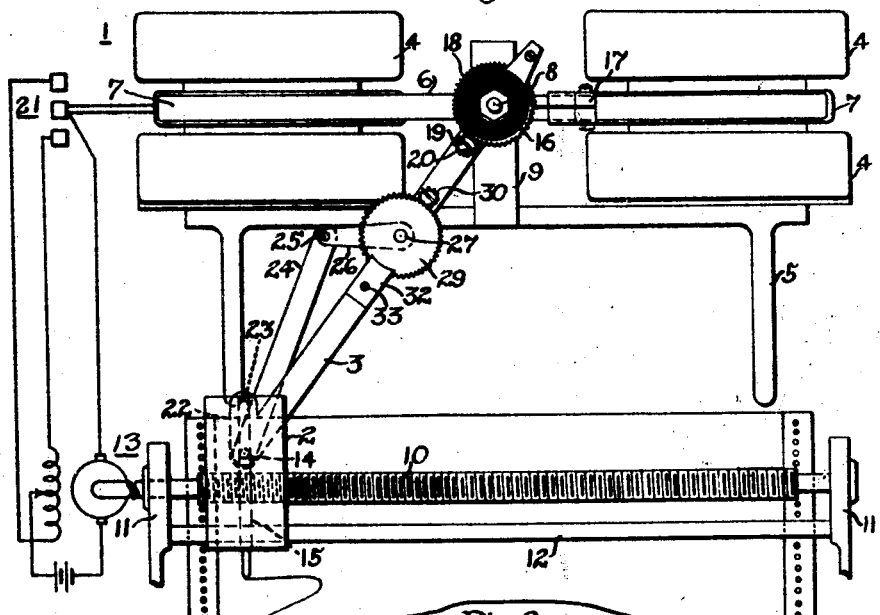
Figure 2:
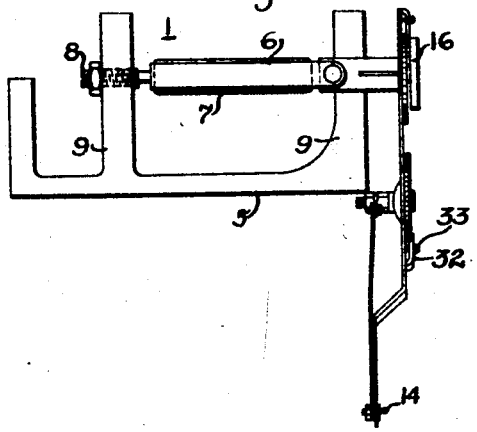
Figure 3:
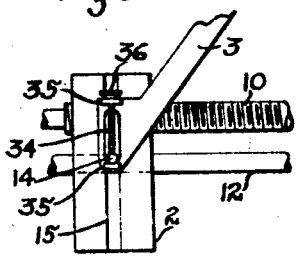

Figure 1 of the accompanying drawings is a front elevational view of a portion only of a graphic meter embodying my invention;

Fig. 2 is a view taken at right angles to Fig. 1, with portions of the instrument, as illustrated in Fig. 1, omitted, and Fig. 3 is a detail view of a modified form of my invention.

In copending application, Serial No. 514,260, graphic-meter control mechanism, filed July 11, 1922, by R. T. Pierce and assigned to the Westinghouse Electric & Manufacturing Company, is set forth an instrument, similar to the instrument of my invention, to which reference may be had for a more complete understanding of my invention.

An instrument embodying my invention may comprise, in general, a Kelvin balance 1, a traveling nut or pen carriage 2 and a pivoted arm or control member 3 connected between the balance 1 and the recording member 2.

The Kelvin balance 1 comprises the usual stationary coils 4 that may be suitably mounted on a bracket 5 constituting a portion of the instrument frame or housing and a movable element 6, carrying the movable coils 7 and mounted on pivot pins 8 that are supported in arms 9 on the bracket 5.

The movable recording element or pen carriage 2 comprises substantially a traveling nut mounted on a screw shaft 10 that is mounted on bearing brackets 11 and is adapted to be actuated by a pilot motor 13. A rod or bar 12, extending between the brackets 11, slidably receives the nut 2 to prevent turning of the latter.

The arm 3 is co-axially pivoted, with respect to the element 6, on one of the pins 8 and is provided, at its free end, with a slot 15 in the rear side of the member 2 along which a pin 14 is adapted to slide. A spiral spring 16 is connected, at its inner end, to the arm 3 and, at its outer end, to the member 6 by a clamp 17. The inner end of the spring 16 is preferably connected to the arm through a serrated disk or gear member 18 which meshes with a similar smaller member 19 on the arm 3. The member 19 is provided with a slot 20 by which adjustment of the inner end of the spring 16 may be effected by means of a screw driver.

The free end of the arm 3 is provided with a portion 22 having a slot 23 therein that, in the initial or zero position of the instrument parts, lies parallel and adjacent to the slot 15 in the member 2. The pin 14 is secured to one end of the auxiliary arm 24 that is connected, by a pin 25, a lever arm 26 and a pin 27, to the arm 3. Members 29 and 30, similar to members 18 and 19, respectively, are provided to adjustably move the arm 26 about the pivot axis of the pin 27 to thereby move the pin 14 in the slot 23. An additional locking clamp or dog 32, secured in position by a screw 33, may be provided to assist in holding the member 29 in adjusted position.

The coils 4 and 7 of the Kelvin balance 1 are for connection to an electric circuit to be thereby energized in accordance with any quantity of the circuit which it is desired to measure. Contact members 21, actuated by the balance member 6, control the actuating motor 13 of the shaft 10 in a usual manner.

With the parts in the initial or zero position, as illustrated, assuming that the spring 16 has been previously adjusted, if it is desired to vary the degree by which movement of the member 2 tensions the spring 16, it is only necessary to release the clamp 32 and, by turning the member 30, thereby turn the lever arm 26 and the arm 24 to move the pin 14 to any desired position in the slot 23. During this adjustment, the angular relation of the arm 3 and the member 2 remains undisturbed and, therefore, no influence is exerted upon the spring 16. However, adjustment of the pin 14 to different positions in the slot 23 sufficiently varies the angular distance through which the pin will move for a given movement of the member 2 to permit considerable latitude in the adjustment of the device after the zero setting has been effected.

The form of my invention illustrated in Fig. 3, in which similar parts are designated by similar reference characters, is substantially the same as that illustrated in Figs. 1 and 2, with the exception of the means for adjusting the pin 14. In this form, the arms 24 and 26 are omitted and a vertical screw 34 is substituted therefor. The screw 34 is suitably supported on the arm 3, as in struck-up bearing lugs 35, and extends through the pin 14 so that, by turning the head 36 of the screw 34, the pin may be adjusted.

Since, by the use of my invention, a desirable adjustment of the instrument may be effected without disturbing the zero setting thereof, a very desirable improvement which facilitates the adjustment of the device is provided.

While I have shown and described particular forms of my invention, changes may be effected therein without departing from the spirit and scope thereof, as set forth in the appended claims.

I claim as my invention:

1. In a measuring instrument, the combination with a Kelvin balance and a rectilinearly-movable indicating member controlled thereby, of means controlled by the indicating member for opposing movement of the balance by a predetermined initial force and thereafter by one of a plurality of selective ranges of forces each in proportion to the moving forces of the balance.

2. In a measuring instrument, the combination with a Kelvin balance and a rectilinearly-moving indicating member controlled thereby, of means directly mechanically connected between the balance and the indicating member for translating the rectilinear movement of the latter into angular movement of the balance and controlled by the indicating member to oppose movement of the balance by a predetermined initial force and thereafter by one of a plurality of selective ranges of forces each in proportion to the moving forces of the balance.

3. In a measuring instrument, the combination with a Kelvin balance and a rectilinearly-movable indicating member controlled thereby, of means including a spring and controlled by the indicating member for translating the rectilinear movement of the latter into angular movement of the balance and opposing movement of the balance by a predetermined initial force and thereafter by one of a plurality of selective ranges of forces each in proportion to the moving forces of the balance.

4. In a measuring instrument, the combination with a Kelvin balance and a rectilinearly-movably indicating member controlled thereby, of a member relatively-movably pivotally related to the pivot axis of the balance, a spring connected between the pivoted member and the balance, and means adjustably connecting the pivoted member to the indicating member.

5. A measuring instrument comprising a rectilinearly movable member, a pivoted arm diagonally related thereto in an initial position and lost-motion connecting means adjustable in a direction normal to the direction of movement of the movable member in said initial position.

6. In a measuring instrument, the combination with a Kelvin balance, of a rectilinearly-movable indicating member controlled thereby, a member relatively-movably pivotally related to the pivot axis of the balance, a spiral spring connected between the pivoted member and the balance, and means constituting an adjustable pin-and-slot connection between the pivoted member and the indicating member in which the slot extends normal to the path of movement of the latter.

7. A measuring instrument comprising a horizontally-movable member having a vertical slot therein, a pivoted arm diagonally disposed relative to said slot in an initial position and having a guideway parallel to said slot in said position, and a pin connected between the slot and the guideway and adjustable along both thereof.

8. A measuring instrument comprising an angularly-movable quantity responsive element, a rectilinearly movable member controlled by said element to move in accordance with variations in said quantity, means operatively connected between said element and said member to oppose movement of the element in accordance with the position of the member and means for varying the degree of opposition exerted by said opposing means without disturbing the zero adjustment of the instrument.

9. An electric meter comprising a movable element actuated in accordance with a quantity of a circuit to be measured, a member controlled by said element to move in accordance with variations in said quantity, means including a spring operatively connected between said element and said member to oppose movement of the element in accordance with the position of the member and means independent of the spring for adjusting said means to affect the element by any one of various sets of forces for given movements of the movable member.

10. A graphic meter comprising a Kelvin balance actuated in accordance with a quantity of a circuit to be measured, a rectilinearly movable recording device controlled by said balance to move in accordance with variations in said quantity, an arm pivoted coaxially with the axis of movement of the balance and relatively movable with respect to the latter, a spring connected between said arm and said balance to oppose movement of the balance in accordance with the position of the recording device and means constituting an adjustable connection between the free end of said arm and the recording device for varying the effect on said spring of given movements of the recording device.

In testimony whereof, I have hereunto subscribed my name this 14th day of October, 1922.

VICTOR H. TODD.